United States Patent [19]

Naruse et al.

[11] Patent Number: 4,737,815

[45] Date of Patent: Apr. 12, 1988

[54] PHOTOMETER

[75] Inventors: Kazuhiko Naruse, Nabari; Naoya Takata, Osaka; Yoshihiko Azuma, Kyoto; Takehiro Katoh, Sakai, all of Japan

[73] Assignee: Minolta Camera Kabushiki Kaisha, Osaka, Japan

[21] Appl. No.: 85,641

[22] Filed: Aug. 13, 1987

[30] Foreign Application Priority Data

Aug. 13, 1986 [JP] Japan ................................. 61-190240
Aug. 13, 1986 [JP] Japan ................................. 61-190241
Aug. 13, 1986 [JP] Japan ................................. 61-190242

[51] Int. Cl.$^4$ ............................................. G03B 17/18
[52] U.S. Cl. ..................... 354/474; 354/475; 354/127.1
[58] Field of Search ............... 354/471, 472, 474, 475, 354/127.1

[56] References Cited

U.S. PATENT DOCUMENTS

| | | | |
|---|---|---|---|
| 4,176,955 | 12/1979 | Yamada et al. | |
| 4,182,573 | 1/1980 | Yamada et al. | |
| 4,291,979 | 9/1981 | Yuasa et al. | |
| 4,309,090 | 1/1982 | Yamada | |
| 4,367,932 | 1/1983 | Ishikawa et al. | |
| 4,373,793 | 2/1983 | Taniguchi et al. | |
| 4,396,263 | 8/1983 | Yamada | |
| 4,397,553 | 8/1983 | Yuasa et al. | |
| 4,401,386 | 8/1983 | Yuasa et al. | |
| 4,529,289 | 7/1985 | Tsunefuji et al. | 354/472 |
| 4,589,755 | 5/1986 | Maitani et al. | 354/472 |
| 4,589,757 | 5/1986 | Maitani et al. | 354/472 |
| 4,618,238 | 10/1986 | Maitani et al. | 354/472 |
| 4,655,576 | 4/1987 | Yuasa et al. | |

Primary Examiner—Russell E. Adams
Attorney, Agent, or Firm—Price, Gess & Ubell

[57] ABSTRACT

A photometer comprising a measurement button and a FIX key; a photoelectric conversion circuit which is actuated by the measurement button so as to start a measurement; a random-access memory which holds a measured light value, obtained through the measurement by the photoelectric conversion circuit, when the FIX key is operated; an accumulator which calculates deviation of a measured light value obtained through the measurement effected by the photoelectric conversion circuit from the measured light value held by the random-access memory; and a display element by which; (a) when the random-access memory is not holding a measured light value, a measured light value obtained through the measurement effected by the photoelectric conversion circuit is displayed, (b) when the random-access memory is holding a measured light value and the measurement button is out of operation, the measured light value being held is displayed, and (c) when the random-access memory is holding a measured light value and the measurement button is operated, the deviation obtained by the accumulator is displayed instead of the measured light values while the measurement button is in operation.

11 Claims, 12 Drawing Sheets

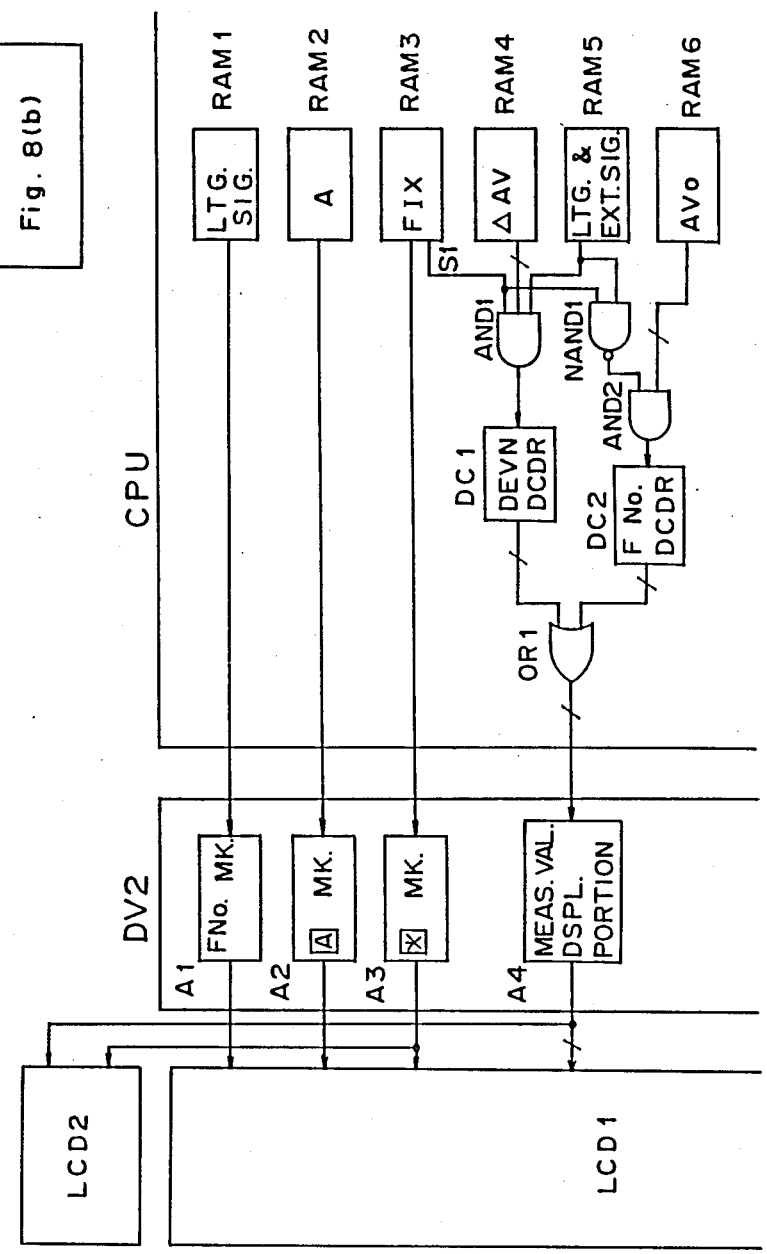

PHOTOMETER

BACKGROUND OF THE INVENTION

The present invention relates a photometer capable of displaying difference between a couple of measured values.

Generally, in taking pictures, a photometer capable of displaying a difference between measured light values of two arbitrary spots on an object field is required especially when a photographer wants the whole object to exist within the effective exposure range of a film.

As a photometer of the type, U.S. Pat. Nos. 4,309,090 and 4,396,263 disclose exposure display devices which are adapted to display a difference between a measured value of a comparatively wide area and that of a comparatively narrow area. The difference value to be displayed by such devices is obtained by two independent photometry means; one for the comparatively wide area and the other for the comparatively narrow area.

Equipping a photometer with two photometry devices as seen in the above conventional photometers, however, causes disadvantages such as complication of the photometer, increase in cost, inconvenience in the use, and so on.

In addition to the above described photometers, a flash meter adapted to display a ratio of flashlight components to ambient light components has been proposed. In taking pictures, it is very important to know the ratio of the flashlight to the ambient light, because, if these lights to illuminate an object are different from each other in light characteristics, it is required to know a possible final image in advance before taking pictures. Especially in the case that the ambient light is of a tungsten lamp, it is essential. The color temperature of the tungsten light is relatively low with respect to a film suitable for light of a day light type, and so, the color tone of the final image becomes more reddish in proportion to the amount of the tungsten light components. On the contrary, the final image has a more natural color tone as the flashlight components increase. This is why it is necessary to know the ratio of the amount of the ambient light components to the total light amount in advance. Then, that ratio may be adjusted according to a photographer's intent so that the reddish tone may be emphasized or weakened.

The above described conventional flash meter is adapted to display simultaneously a first dot indicating the total amount of the flashlight components and the ambient light components, a second dot indicating the amount of the flashlight components, and a third dot indicating the amount of the ambient light components on an analog scale. Due to the simultaneous display of those amounts, some users unfamiliar with such a flash meter could not read the scale easily. Then, from the point of view of facilitating the reading of data, it can be considered that the realization of displaying by digits the difference between the measured value of light coming from an object in the flash containing the ambient light and that in only the ambient light for the numerical representation of the efficiency of the flash will allow users to know easily and quantitatively that a greater difference value indicates a more natural tone and a smaller one indicates a more reddish tone inherent in the tungsten lamp.

SUMMARY OF THE INVENTION

The present invention has been developed with a view to eliminating the disadvantages inherent in the prior art and a principal object of the invention is to provide a photometer of a simple construction and easy to operate by which a difference between measured light values can be displayed.

In order to accomplish the above object, a first photometer of the present invention comprises, as shown in FIG. 1, first and second operating members; a light measuring means which is actuated by the first operating member so as to start a measurement; a holding means which holds a measured light value, obtained through the measurement by the light measuring means, when the second operating member is operated; a calculating means which calculates deviation of a measured light value obtained through the measurement effected by the light measuring means from the measured light value held by the holding member; and a displaying means by which; (a) when the holding means is not holding a measured light value, a measured light value obtained through the measurement effected by the light measuring means is displayed, (b) when the holding means is holding a measured light value and the first operating member is out of operation, the measured light value being held is displayed, and (c) when the holding means is holding a measured light value and the first operating member is operated, the deviation obtained by the calculating means is displayed instead of the measured light values while the first operating member is in operation.

The first photometer of the above construction acts as follows: First of all, the light measuring means is caused to carry out a measurement by the operation of the first operating member. The holding means holds a measured light value obtained through the measurement by the measuring means when the second operating member is operated. The displaying means displays the measured light value held by the holding means, whereby photographers can be know the held value. When the first operating member is operated while the measured value is being held by the holding means, a new measured light value is obtained by the light measuring means and the calculating means carries out a calculation to get a deviation of the actual measured value from the held value. The deviation thus obtained replaces the above measured light value on display, thereby being displayed by the displaying means.

Also, in order to accomplish the above object, a second photometer of the present invention comprises, as shown in FIG. 2, first and second operating members; a light measuring means which is actuated by the first operating members so as to start measurement; a modifying means for adding a predetermined bias to a measured light value obtained through the measurement effected by the light measuring means in response to the operation of the second operating member; a holding means which hc,lds a light value modified by the modifying means; a calculating means which calculates deviation of a measured light value obtained through the measurement effected by the light measuring means from the modified light value, as st:andard, being held by the holding means; and a displaying means by which; (a) when no modified light value is being held by the holding means, a measured light value obtained through the measurement effected by the light measuring means is displayed, (b) when the holding means is holding a modified light value and the first operating member is out of operation, the modified light value held by the holding means is displayed, and (c) when the holding means is holding a modified light value and the first operating member is operated, deviation calculated by the calculating means is displayed instead of said measured light value and modified light value while the first operating means is in operation.

The second photometer of the above construction acts similarly to the first photometer at many points. In this photometer, the holding means does not hold a measured light value itself but a value obtained by adding the predetermined bias to the measured light value so as to modify the latter, and accordingly, the calculating means calculates a deviation of an actual measured value from the modified value. The displaying means displays the modified value being held by the holding means, though when the deviation of the actual measured value from the modified value is obtained by the calculating mears, the modified value on display is replaced by the deviation.

Another object of the present invention is to provide a photometer easy to handle which can memorize a measured value of light coming from an important point of a subject so that, in calculating the deviation of a measured value of another point from the measured value of the important point, the memorized value may be preferentially used as a reference value.

In order to accomplish the object, a third photometer of the present invention comprises, as shown in FIG. 3, a measurement initiating means; a light measuring means which is caused to start a measurement by the operation of the measurement initiating means; a first operating member for causing a measured light value obtained through the measurement of the light measuring means to be stored in place; a storing means for memcrizing the measured light value in response to the operation of the first operating member; a second operating member for causing a measured light value to be held in place; a holding means which, if the storing means is storing a measured light value when the second operating member is operated, holds the stored value, while it holds a measured light value obtained by the light measuring means if no measured value is stored in the storing means when the second operating member is operated; a calculating means which calculates deviation of a measured light value obtained by the light measuring means from a measured light value, as standard, held by the holding means when the measurement initiating means is operated under the condition that the holding means is holding a measured light value; and a displaying means for displaying a measured light value obtained by the light measuring means, which value is replaced by a value held by the holding means when the second operating member is operated, and is also replaced by the deviation after it has been obtained by the calculating means.

The third photometer of the above construction acts as follows: First of all, the light measuring means is caused to start a measurement by the operation of the measurement initiating means. The displaying means displays a measured light value obtained through the measurement effected by the light measuring means. This value can be memorized in the storing means by operating the first operating member. In a calculation of a deviation, a standard value for the deviation calculation is stored in the holding means by means of the operation of the second operating means. When a measured light value is stored in advance in the storing means, the holding means holds this value as standard for the deviation measurement. On the other hand, when there is no measured light value in the storing means, the holding means holds a measured light value obtained by the light measuring means as standard. The displaying means displays the measured light value held by the holding means. When the measurement initiating means is newly operated while the holding means is storing some value, a new measured light value is obtained by the light measuring means and the deviation of the actual measured light value from the measured light value held by the holding means is calculated by the calculating means. The displaying means displays the deviation thus obtained instead of the measured light value having been on display.

Also, in order to accomplish the above object, a fourth photometer according to the present invention comprises, as shown in FIG. 4, a measurement initiating means; a light measuring means which is caused to start a measurement by the operation of the measurement initiating means; a first operating member for causing a measured light value obtained through the measurement of the light measuring means to be stored in place; a storing means for storing s measured light value obtained through the measurement by the light measuring means in response to the operation of the first operating member; a second operating member for causing an arithmetic operation to add a predetermined bias to a measured light value and storage of the operation results; a modifying and holding means by which; (a) if the storing means is storing a measured light value when the second operating member is operated, the arithmetic operation to add the predetermined bias to the stored light value is effected for modifying the stored light value and then the operation results are held, and (b) if the storing means is storing no measured light value, the arithmetic operation is effected for adding the predetermined bias to a measured light value obtained through the measurement by the light measuring means and then the operation results are held; a calculating means by which, when the measurement initiating means is operated while the modifying and holding means is storing a modified light value, deviation of an actual measured light value obtained by the light measuring means from the modified light value, as standard, being held by the modifying and holding means is calculated; and a displaying means for displaying a measured light value obtained by the light measuring means, which value is replaced by a value held by the modifying and holding means when the modifying and holding means is operated, and is also replaced by the deviation after it has been obtained by the calculating means.

The photometer of the above construction acts similarly to the above third photometer in substance, though data to be held in the modifying and holding means is not a measured light value itself obtained through a measurement but a modified value obtained through the arithmetic operation to add the predetermined bias to the measured light value. Therefore, the calculating means calculates a deviation of an actual measured light value from the modified value as standard. The displaying means displays the modified value being held by the mcdifying and holding means, though the modified value on display is replaced by the deviation of the actual measured value when it is obtained by the calculating means.

A further object of the present invention is to provide a photometer which is simply constructed and can display by digits the difference between a measured value of flashlight containing an ambient light and that of only the ambient light.

In order to accomplish to the above object, a fifth photometer of the present invention comprises, as shown in FIG. 5, a selecting means which selects either a first photometric state for measuring a flashlight containing an ambient light or a second photometric state for measuring the ambient light; a measurement initiating means; a measuring means which is actuated by the measurement initiating means so as to carry out a measurement in one of the first and second photometric states selected by the selecting means; an operating member for causing a measured light value obtained by the measuring means to be held in place; a holding means which holds a measured light value obtained in the one of the above photometric states when the operating member is operated; a calculating means by which, when the measurement initiating means is operated after selection of the other photometric state under the condition that the holding means is holding a measured light value obtained in the one photometric state, a deviation of a measured light value obtained through the measurement effected by the measuring means in the other photometric state from the measured light value held by the holding means is calculated; and a displaying means which numerically displays the measured light value obtained by the measuring means, which value is replaced by the deviation calculated by the calculating means.

The fifth photometer of the above construction acts as follows: First of all, the selecting means selects either the first photometric state for measuring a flashlight containing an ambient light or the second photometric state for measuring the ambient light. When the measurement initiating means is operated, the measuring means effects a measurement in one photometric state selected by the selecting means. A measured light value obtained through this measurement is numerically displayed. Operating of the operating member causes the holding means to hold the measured light value obtained through the measurement in said one photometric state. Then, with the measured light value being held by the holding means, if the photometric state is switched to the other photometric state by the selecting means and the measurement initiating means is operated again, a measured light value under the other photometric state is obtained. The calculating means calculates a difference between the measured light value held by the holding means and the measured light value newly obtained in the other photometric state. The difference thus obtained is numerically displayed instead of the measured light value by the displaying means. Through the above operation, the difference between the measured value of the flashlight containing the ambient light and that of only the ambient light can be numerically displayed.

BRIEF DESCRIPTION OF THE DRAWINGS

The present invention will now be described with reference to the appended drawings, provided purely by way of a non-limiting example, in which:

FIGS. 8(a) and 8(b), taken together as shown in FIG. 8, show a block of an essential portion of the photometer;

DETAILED DESCRIPTION OF THE PREFERRED EMBODIMENT

Figure 1:
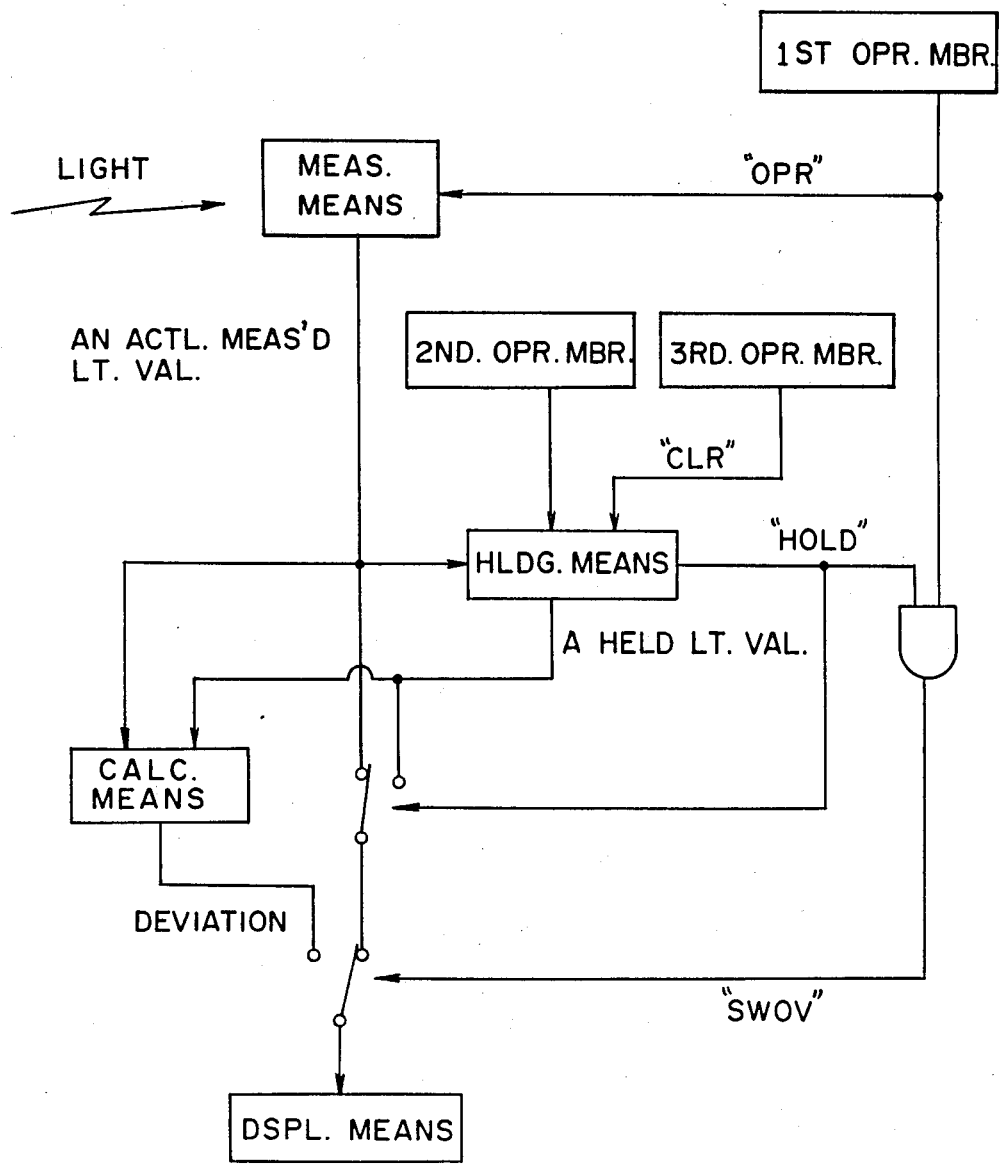
FIGS. 1 to 5 show block diagrams showing schematic construction of the present invention.
Figure 2:
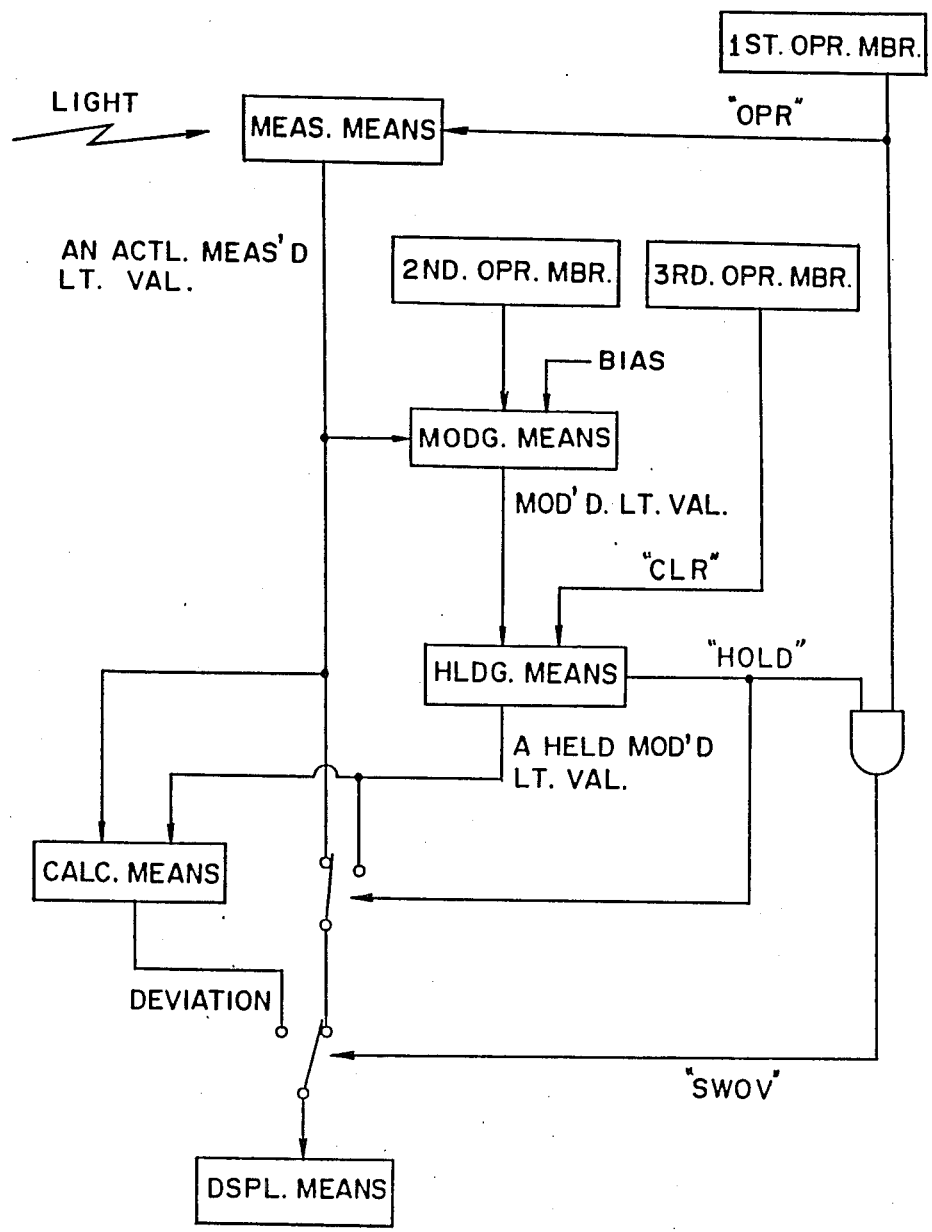
Figure 3:
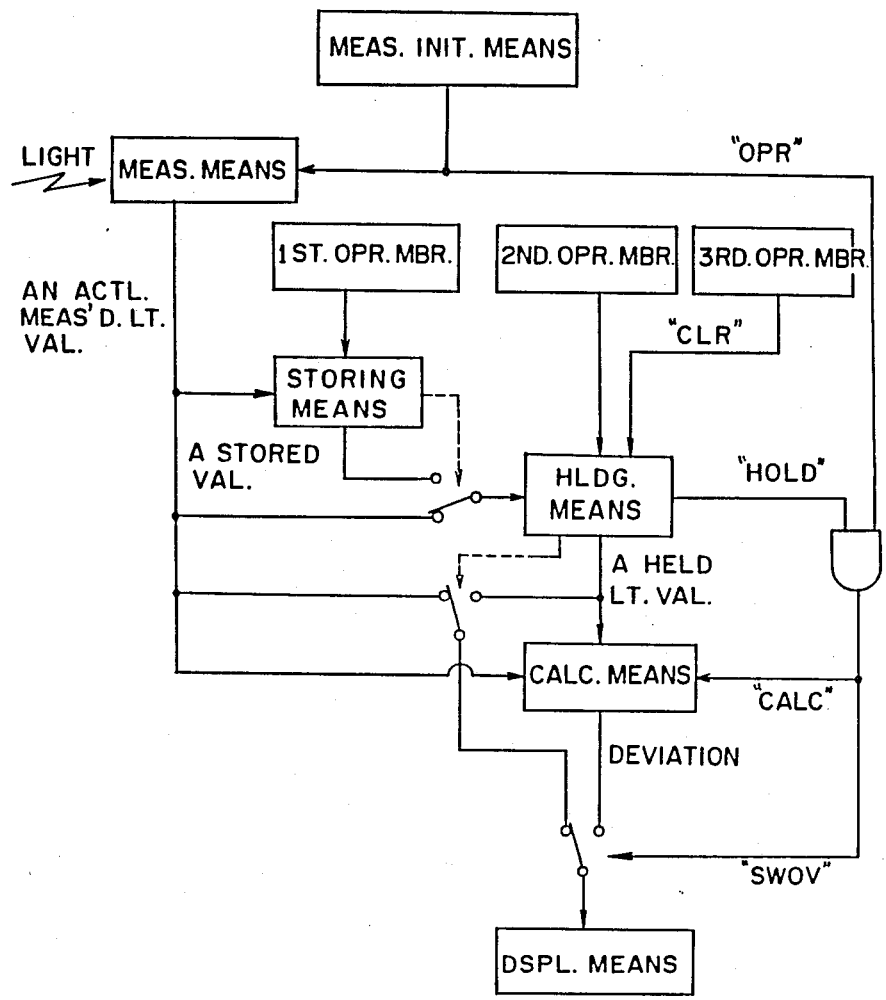
Figure 4:
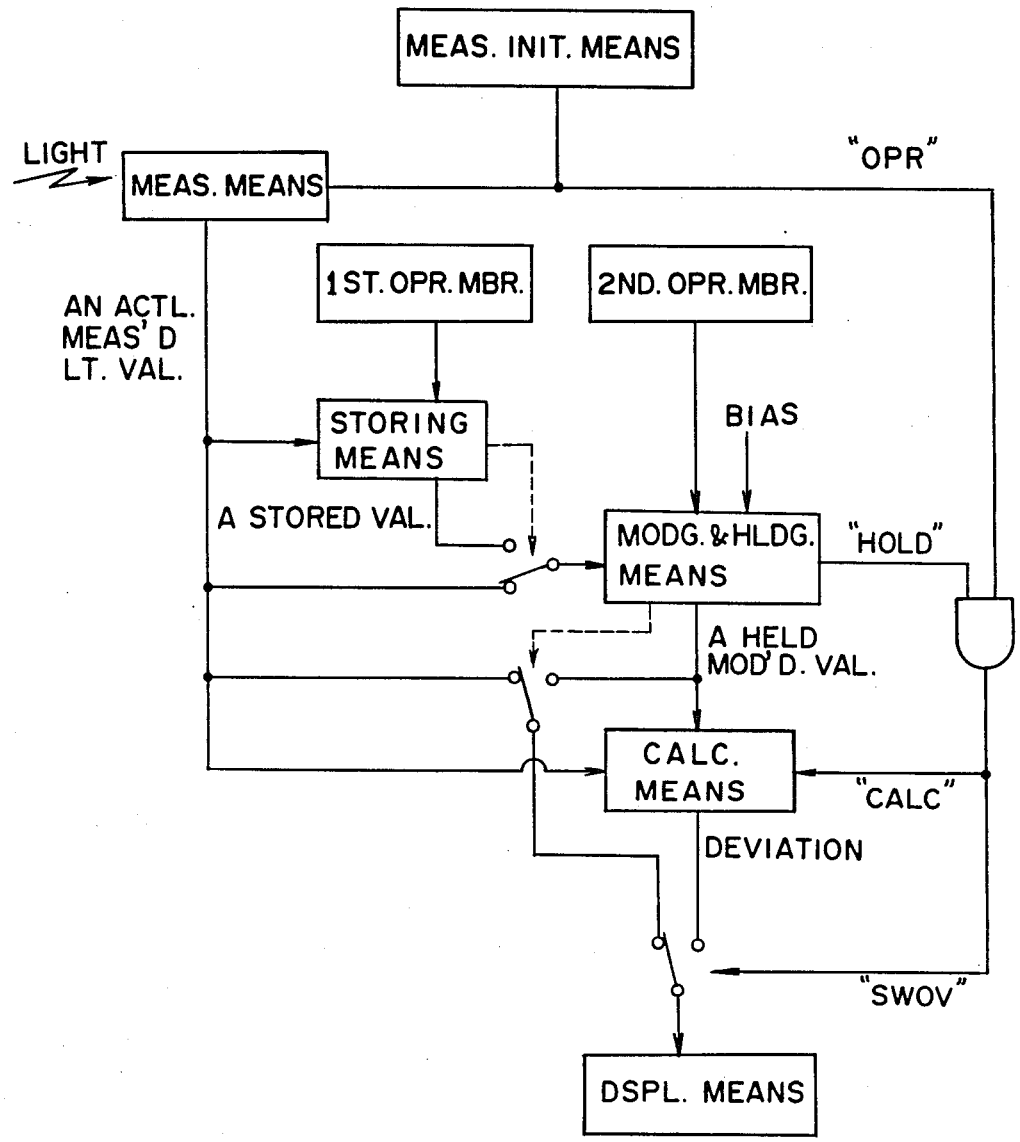
Figure 5:
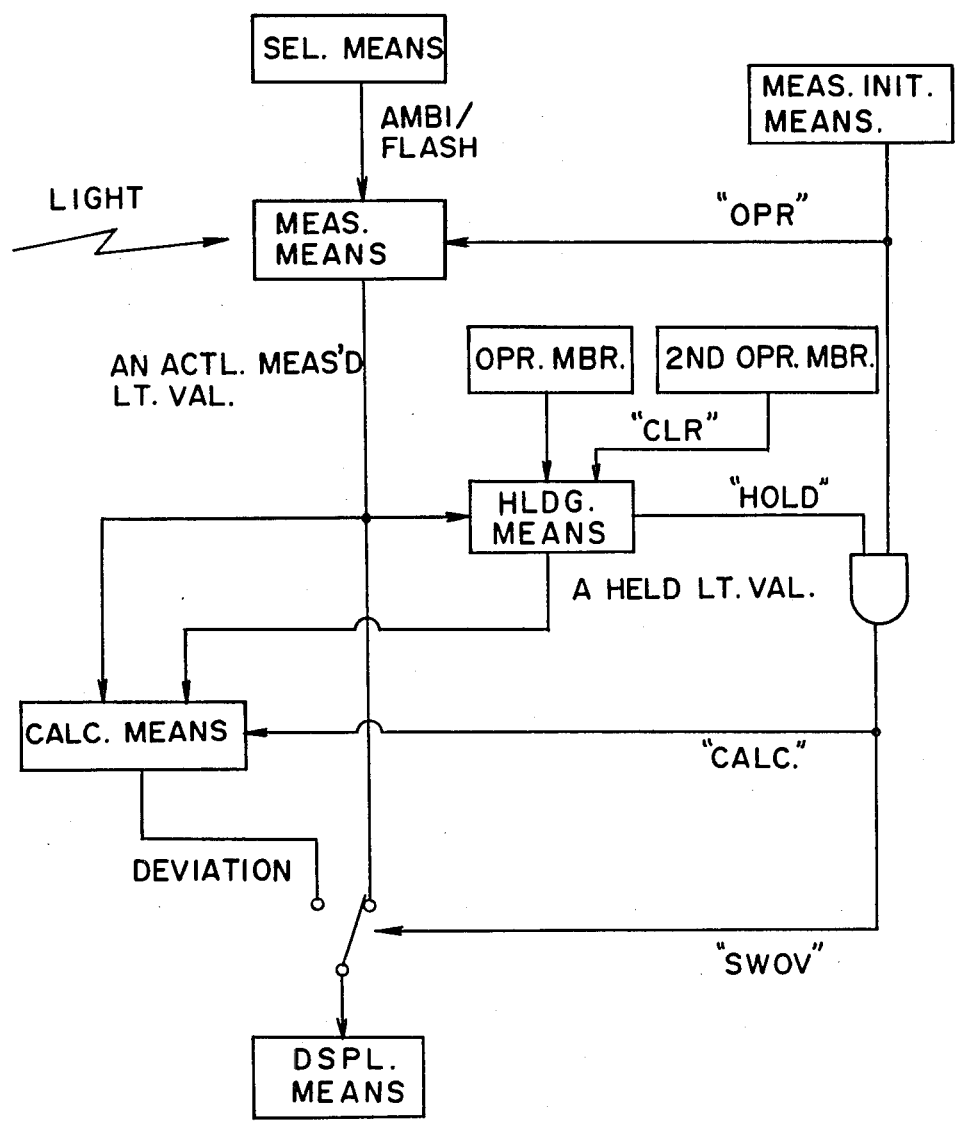
Figure 6:
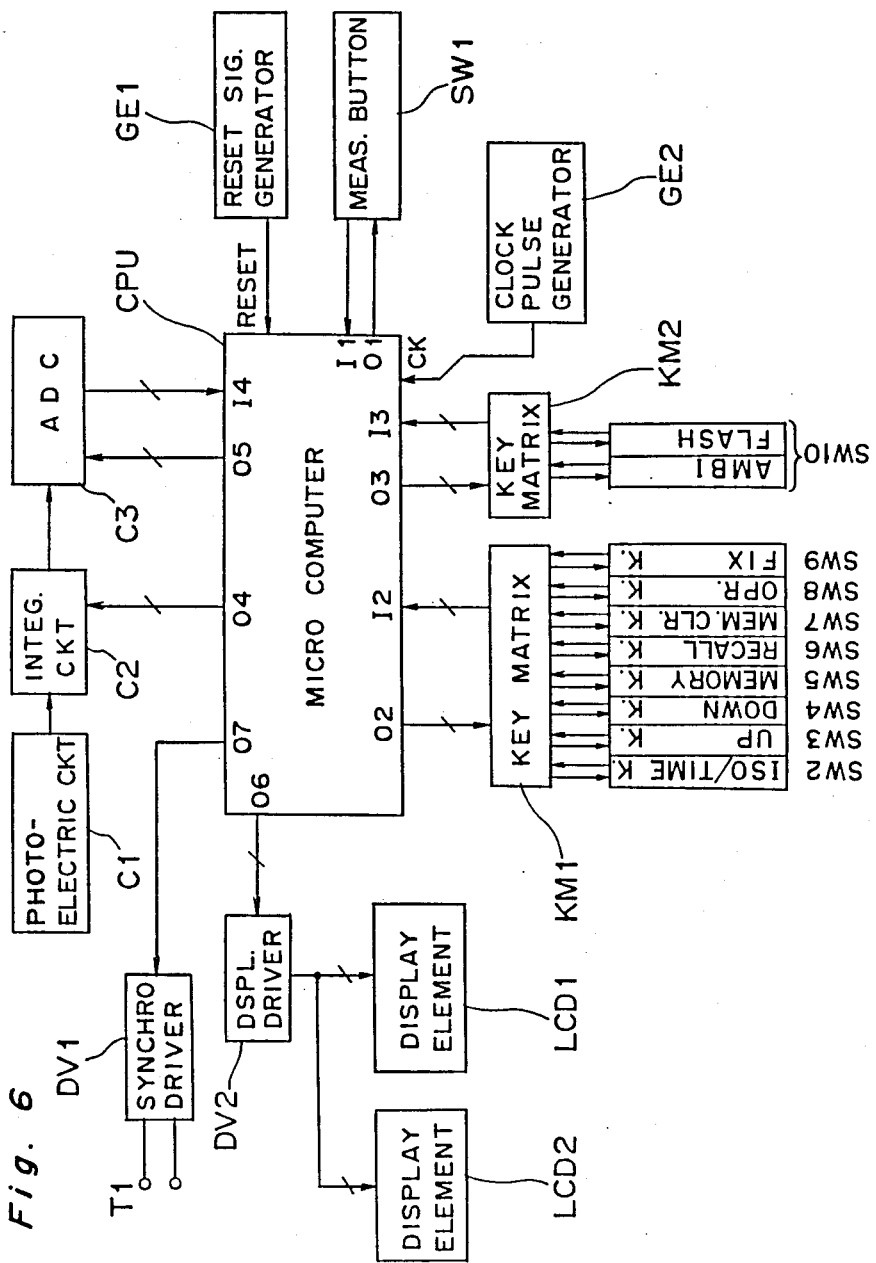
FIG. 6 is a block diagram showing an overall construction of a photometer of an embodiment according to the present invention.

FIG. 6 is a block diagram showing the overall construction of a photometer according to an embodiment of the present invention. A photoelectric conversion circuit C1, consisting of a light receiving element, an operational amplifier, and a diode for logarithmic compression, is adapted to provide an integration circuit C2 with an electric signal in proportion to the logarithm of intensity of incident light into the light receiving element. The light receiving element includes an optical system, for example, so as to measure luminance of a relatively narrow portion of an object field to be measured. The integration circuit C2 is for integrating the light intensity represented by the electric signal outputted from the photoelectric conversion circuit C1 relative to duration manually set or programmed in advance in accordance with a signal outputted from an output terminal O4 of CPU. A symbol "/" on the line connecting the output terminal with the integration circuit C2 means that the line consists of a plurality of lines. The same can be said with lines at other portions.

The electric signal representative of the light amount obtained by the integration circuit C2 is sent to an analog-to-digital conversion circuit C3 so as to be converted into the digital form in response to a signal outputted from an output terminal O5 of CPU. The digital signal obtained as a result of the analog-to-digital conversion is transmitted to an input terminal I4 of CPU together with a signal representative of the completion of the analog-to-digital conversion. For the analog-to-digital conversion circuit C3, various systems such as a double integration system, sequential comparison system and so on can be adopted.

CPU includes a read-only memory (ROM) for storing programs to be carried out in advance, a plurality of random-access memories (RAMs) for storing data temporarily, an accumulator for carrying out different kinds of arithmetic operation, different kinds of decoders, output terminals O1 through O7, input terminals I1 through I4, a reset signal input terminal RESET, a clock input terminal CK and so forth.

When the device is powered on, CPU receives a reset signal from a reset signal generator GE1 at the reset input terminal RESET thereof, and starts carrying out a program memorized in advance in the ROM at a predetermined address. A clock pulse generator GE2 provides the clock input terminal CK with clock pulses. CPU carries out the program in accordance with the clock pulses outputted from the clock pulse generator GE2.

A key matrix KM1 is a matrix circuit for checking status of each of normally open switches SW2 through SW9. The output terminal 02 of CPU outputs strobe signals for testing the switches SW2 through SW9 through the key matrix KM1. The input terminal I2 is for receiving signals indicative of the status of each of the switches SW2 through SW9 through the key matrix KM1. The strobe signals are pulses at a high level. They test the corresponding switches SW2 through SW9 one by one sequentially as the program proceeds. When a switch being tested is in an ON-state, a signal at a high level is inputted into the input terminal I2.

Another key matrix KM2 is a key matrix circuit for knowing the status of a mode switch SW10. The output terminal O3 of CPU outputs a strobe signal for testing the mode switch SW10 through the key matrix KM2. The input terminal I3 receives a signal indicative of the status of the mode switch SW10 through the key matrix KM2.

Now, the function of the switches SW1 through SW10 connected to their respective input terminals I1, I2, I3 and output terminals O1, O2 and O3 will be described.

(i) SWITCH SW1

The switch SW1 is a normal open switch associated with a measurement button. With this switch being turned on, a series of measurement operation is started. Based on a light value obtained through the measurement operation, a film sensitivity and shutter speed manually set with the switches SW2 to SW4, which will be described later, an optimum F-number (this will be referred to as a measured value hereinafter) is calculated. It is when the input terminal I1 receives a signal at a high level in response to the output signal at a high level from the output terminal O1 that CPU judges the switch SW1 to be in an ON-state, while CPU judges the switch SW1 to be in an OFF-state from the input signal at a low level. This switch will be referred to as a measurement button hereinafter.

(ii) SWITCHES SW2, SW3 and SW4 related to the setting of a film sensitivity and a shutter speed The switch SW2 is associated with a ISO/TIME key to display arbitrarily either a film sensitivity value (ISO value) or a shutter speed value (TIME value) on a display element LCD1. This switch will be referred to as ISO/TIME key hereinafter.

The switch SW3 is associated with an UP key. This switch is used for increasing the ISO value and/or TIME value displayed on the display element LCD 1 by the depressing of the ISO/TIME key. The switch SW3 will be referred to as UP key hereinafter.

The switch SW4 is associated with a DOWN key to decrease the ISO value and/or TIME value, in contrast with the switch SW3. This switch will be referred to as DOWN key hereinafter.

(iii) SWITCHES SW5, SW6 and SW7 related to memories

The switch SW5 is associated with a MEMORY key. With the switch SW5 on, data on measured value are stored in a specified RAM of CPU. This switch will be referred to as MEMORY key.

The switch SW6 is associated with a RECALL key. While the switch SW6 is in an ON-state, t.he measured value memorized by the operation of the MEMORY key SW5 are displayed on the display elements LCD1 and LCD2. This switch will be referred to as RECALL key hereinafter.

The switch SW7 is associated with a MEMORY CLEAR key. With the switch SW7 on, the deletion of the data memorized by the operation of the MEMORY key SW5 is carried out. This switch will be referred to as MEMORY CLEAR key.

(iv) SWITCH SW8 related to an arithmetic operation

The switch SW8 is associated with an OPERATION key. When the switch SW8 is set to ON, a programmed arithmetic operation for modifying the measured value is carried out. The operation results are not only displayed as a modified value on the display elements LCD1 and LCD2, but also stored in a RAM of CPU. In measurements performed while the modified value is stored, the display elements LCD1 and LCD2 are adapted to display the deviation of a measured value obtained through a final measurement from the modified value instead of the measured value. This switch will be referred to as OPERATION key.

In computing exposure values, there may be two different kinds of references, one for obtaining a highlight effect to tone up measured point and the other for obtaining a shadow effect to tone down the measured point. The modification of measured values is achieved by adding or subtracting some bias according to the demand for the highlight effect or the shadow effect. The OPERATION key is used for obtaining a F-number based on each of the above references.

(v) SWITCH SW9

The switch SW9 is associated with a FIX key. When the switch SW9 is turned on, the value memorized by the operation of the MEMORY key is stored in another RAM of CPU. In measurements performed while the value is kept in the RAM, the display elements LCD1 and LCD2 are adapted to display the deviation of a final measured value from the memorized value. This switch will be referred to as FIX key.

(vi) SWITCH SW10

The switch SW10 is a mode changeover switch to be set either to "AMBI" or to "FLASH". This switch will be referred to as a MODE switch. "AMBI" causes the photometer of this embodiment to measure the ambient light. When "FLASH" is selected, CPU outputs a signal at a high level from the output terminal O7 on the start of the measurement so as to operate a synchro driver DV1 for short-circuiting a synchronous terminal T1. The short circuit of the synchronous terminal T1 causes a flash device connected thereto through a cord to flash so that measurement may be effected under flash light.

Figure 7A:
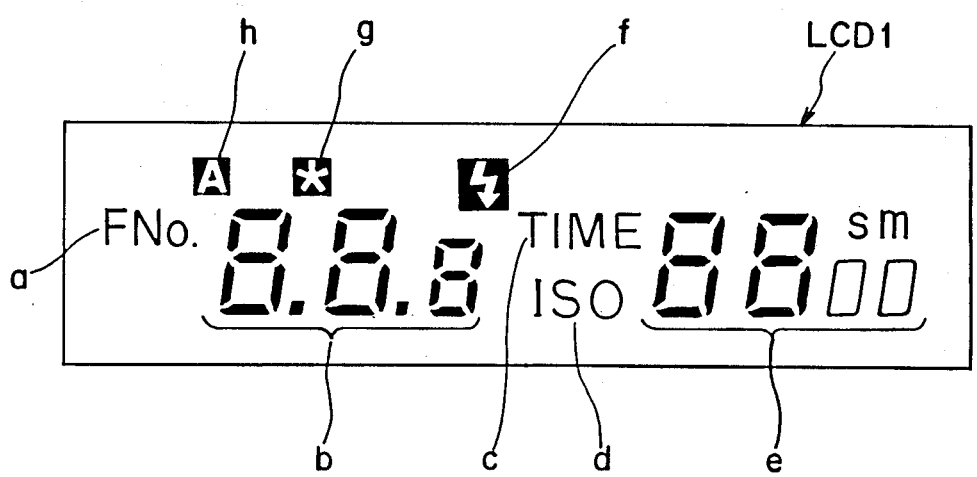
FIGS. 7(a) and 7(b) show the state of two different display elements in which all segments thereof are lighted, respectively.
Figure 7B:
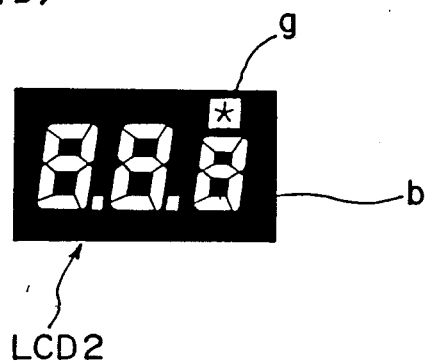

The output terminal O6 of CPU is connected to a display element driver DV2 for driving the display elements LCD1 and LCD2. The display element driver DV2 has a RAM corresponding to segments constituting the display elements LCD1 and LCD2. The segments of the display elements LCD1 and LCD2 all lighted are shown in FIGS. 7(a) and (b), respectively. The display element LCD1 is disposed on one side of the photometer body while the other display element LCD2 is provided in an observable position inside a viewfinder.

In FIG. 7(a) showing the display element LCD1, reference character "a" designates an aperture or F number mark, "b" designates a measured value display portion, "c" designates a shutter speed or TIME mark, "d" designates a film sensitivity or ISO mark, "e" designates a set value display portion, "f" designates a flash light mark, "g" designates a data-holding mark, and "h" designates an operation mark. The other display element LCD2 is provided with a measured value display portion (b) and a data-holding mark (g). A bar segment at a substantially central portion of the numeral at the leftmost end in the measured value display portion (b) is also used as the minus sign. The data-holding mark (g) may be alternatively replaced by a term such as "FIX", "FREEZE" or the like which signifies that the measured value is kept.

Figure 8B:
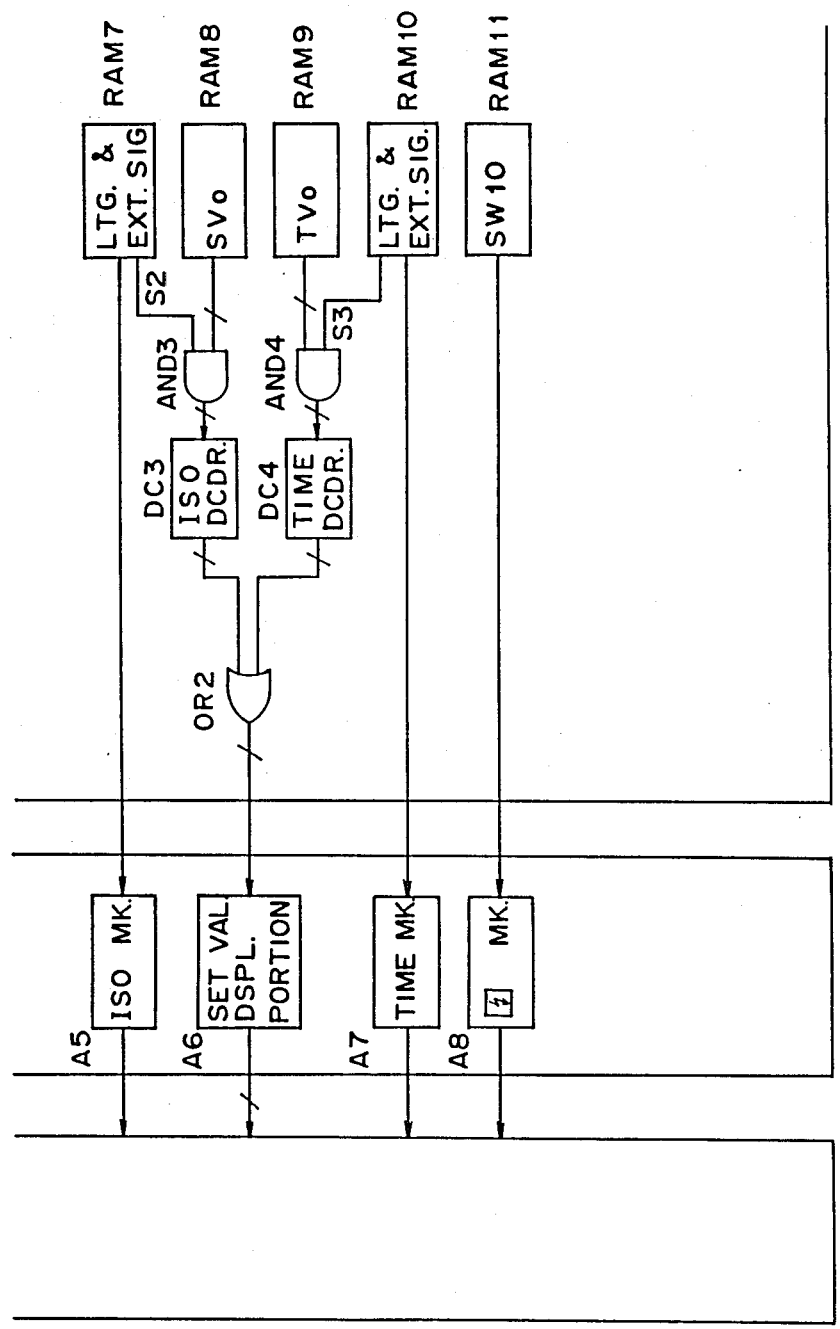

FIG. 8 shows the display element driver DV2 and a display-related portion of CPU in the block style. The driver DV2 of this embodiment is of a static type that its outputs correspond individually to the respective segments of the display elements LCD1 and LCD2. But, alternatively, this display element driver DV2 may be of a dynamic type.

CPU is provided with memories RAM1 through RAM11 for storing display data to be supplied to the respective addresses A1 through A8 of the display element driver DV2, some of which RAMs were already referred to by the foregoing description although the RAMs were not specified.

RAM1 keeps data for outputting a signal to the address A1 of the display driver DV2 so as to light the F-number mark (a) of the display element LCD1.

RAM2 is for storing data A which is to be set when the OPERATION key SW8 is in an ON-state. When data A is present in RAM2, CPU outputs a signal to the address A2 of the display driver DV2 in order to light the operation mark (h) of the display element LCD1.

RAM3 is for storing data FIX which is set while the OPERATION key SW8 or the FIX key SW9 is on. While the data FIX is stored in RAM3, CPU outputs a signal to the address A3 of the display driver DV2 so as to light the data-holding mark (g).

RAM4 memorizes data $\Delta AV$ representing the deviation of a final measured value (value obtained through the final measurement) from the modified measured value (reference to the foregoing description on the switch SW8) when both the operation mark (h) and the data-holding mark (g) are lighted. When only the data-holding mark (g) is lighted, the deviation of the final measured value from the measured value in preservation is stored as data $\Delta AV$ in RAM4. When neither the operation mark (h) nor the data-holding mark (g) is lighted, nothing is stored. The data $\Delta AV$ stored in RAM4 is transferred to a deviation data decoder DC1, if an AND gate AND1 remains passable, and decoded into a signal capable of lighting segments of the measured value display portion (b) of each of the display elements LCD1 and LCD2. Without data FIX, RAM3 outputs a signal at a low level from a terminal S1 to make the AND gate AND1 impassable so as to inhibit RAM4 from outputting data $\Delta AV$. In addition, during the OFF-state of the measurement button SW1, RAM5 outputs a signal at a low level to make the AND gate AND1 impassable so as to inhibit RAM4 from outputting data $\Delta AV$. In other words, the AND gate AND1 is passable for the data $\Delta AV$ only while RAM3 preserves data FIX and also, RAM5 outputs a signal indicative of the measurement button's being in an ON-state.

RAM6 stores data $AV_0$ corresponding to a F-number obtained through the exposure computing process. While an AND gate AND2 is passable, the data $AV_0$ is transferred to a decoder DC2 specialized for the F-number so as to be decoded into a signal capable of lighting corresponding segments of the display elements LCD1 and LCD2. An NAND gate NAND1 outputs a signal at a low level to bring the AND gate AND2 into a prohibitive state so as to prohibit RAM6 from outputting the data $AV_0$ only when both the output signal from the terminal S1 of RAM3 and that from RAM5 are at a high level.

Either the signal decoded by the deviation data decoder DC1 or that decoded by the F-number decoder DC2 is transmitted to the address A4 of the display driver DV2 through an OR gate OR1.

To sum up, when both the signal outputted from the terminal S1 of RAM3 and the signal, representative of the measurement button's being on, outputted from RAM5 are at a high level, the data $\Delta AV$ stored in RAM4 are decoded by the deviation data decoder DC1 and then stored in the address A4 of the driver DV2. In the other cases than this, the data $AV_0$ stored in RAM6 is decoded by the F-number decoder DC2 and then stored in the aodress A4.

The address A4 is connected to the measurement value display portion (b) of each of the display elements LCD1 and LCD2 so that the portion (b) displays a value corresponding either to the data $\Delta AV$ stored in RAM4 or to the data $AV_0$ stored in RAM6.

RAM7 stores data for supplying an address A5 of the driver DV2 with signals to control the lighting or extinguishing of the ISO or film sensitivity mark (d) on the display element LCD1.

RAM8 preserves data $SV_0$ which is to be decoded so as to displayed as the film sensitivity or ISO value. The ISO value corresponding to the data $SV_0$ is set by adding or subtracting a predetermined value to or from the previous ISO value on display together with the ISO mark (d) through the operation of the UP key or the DOWN key.

When the ISO mark (d) is lighted, RAM7 outputs a signal at a high level from a terminal S2 to make another AND-gate AND3 passable and transfer the output data $SV_0$ from RAM8 to a ISO data decoder DC3. The ISO data decoder DC3 decodes the output data $SV_0$ into signals capable of displaying the film sensitivity value numerically on the display element LCD1. When the ISO mark (d) is off, RAM7 outputs a signal at a low level from the terminal S2 to control an AND gate AND3 to be impassable, whereby RAM 8 is inhibited from outputting the data $SV_0$.

RAM10 preserves data for supplying an address A7 of the driver DV2 with signals to control the lighting and extinguishing of the TIME or shutter speed mark (c) of the display element LCD1. RAM9 preserves data $TV_0$ which is to be decoded so as to displayed as a shutter speed or TIME value. The TIME value setting is carried out by adding or subtracting a predetermined value to or from a previous TIME value after depressing the ISO/TIME key to display the previous TIME value together with the TIME mark (c) on the display element LCD1. The adding operation is effected by the UP key while the subtracting operation by the DOWN key. While the TIME mark (c) is lighted, RAM10 outputs a signal at a high level from a terminal S3 to make an AND gate AND4 passable, so that the data $TV_0$ stored in RAM9 is transferred to a TIME data decoder DC4. The TIME data decoder DC4 decodes the output data $TV_0$ into such signals as can be accepted by the display element LCD1.

The character "s" at the set value display portion (e) of the display element LCD1 stands for "second" (See FIG. 7(a)). Data for lighting this character is decoded by the TIME data decoder DC4 while the shutter speed is one to fifty-nine seconds. The character "m" beside the "s" stands for "minute" and the TIME data decoder DC4 functions to output decoded signals to light this character "m" when the shutter speed is one to fifty-nine minutes. While the TIME mark (c) is extinct, RAM10 outputs a signal at a low level from the terminal S3 to control the AND-gate AND4 to be impassable, whereby RAM9 is prohibited from outputting the data $TV_0$.

According to this embodiment, the ISO mark (d) is not lighted or extinguished simultaneously with the TIME mark (c). The ISO/TIME key selects one of them. While the ISO mark (d) is lighted, the output from the terminal S3 of RAM10 is at a low level and the data $TV_0$ from RAM9 is prohibited from being transferred to the decoder DC4. At this time, the data $SV_0$ stored in RAM8 is transmitted to the decoder DC3 through the AND gate AND3 and decoded there. Signals obtained through the decoding are stored in the address A6 of the driver DV2 through an OR-gate OR2. On the other hand, while the TIME mark (c) is lighted, the output from the terminal S2 of RAM7 remains at at low level and the data $SV_0$ from RAM8 is prohibited from being transferred to the decoder DC3 due to the impassability of the AND-gate AND3. At this time, data $TV_0$ stored in RAM9 is transferred to the decoder DC4 through the AND-gate AND4 and decoded there. Signals obtained through this decoding are transmitted to the address A6 of the driver DV2 through the OR-gate OR2.

The address A6 specialized for the TIME or ISO value display is connected to the set value display portion (e) of the display element LCD1, whereby the portion (e) displays a value corresponding to data $SV_0$ stored in RAM8 or data $TV_0$ stored in RAM9.

RAM11 stores data representative of the status of the MODE switch SW10. When the MODE switch SW10 selects "AMBI" or the ambient light, RAM11 outputs a signal to extinguish the flash mark (f) to the address A8 of the driver DV2. On the contrary, while "FLASH" is selected, RAM11 outputs a signal to light the flash mark (f) to the address A8.

In this embodiment, the addresses of the driver DV2 are connected to the CPU in parallel. But, alternatively, signals may be transmitted from the port of the latter to the former in serial form. Also, in this embodiment, the decoding is carried out by the decoders provided in CPU, although a program to be stored in ROM may do it instead of the decoders.

Figure 9A:
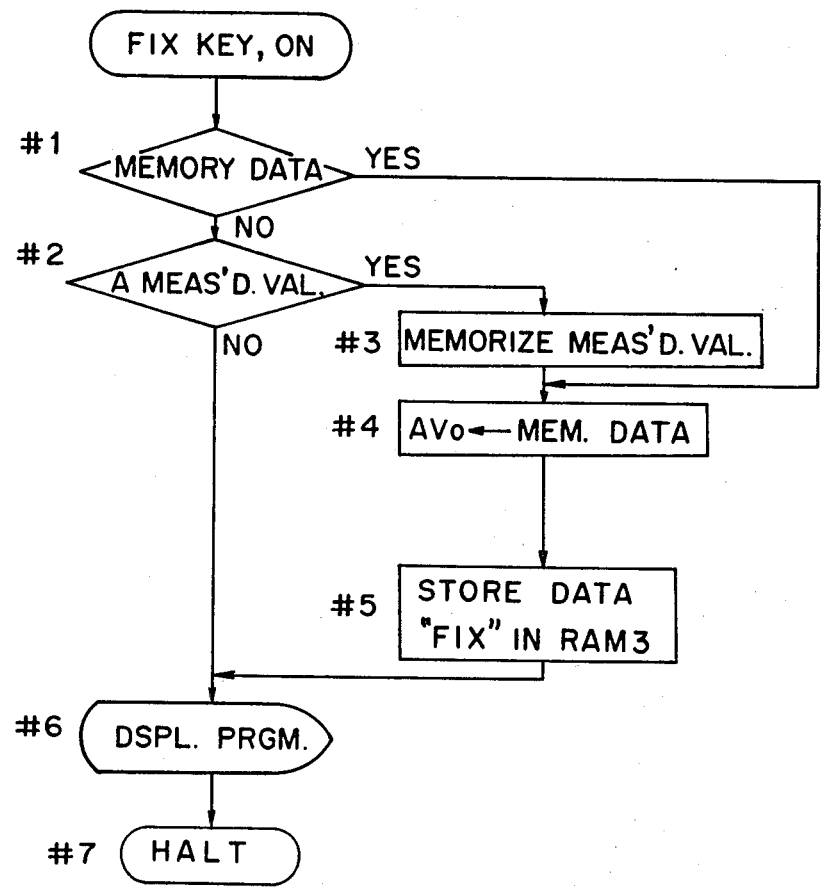
FIG. 9(a) shows a flow of a program to be carried out when a FIX-key is in an ON-state.

FIG. 9(a) shows a flow of a program to be carried out when the FIX key SW9 is brought to an ON-state. In this flow, at step #1, it is discriminated whether or not a measured value is memorized. When some measured value is memorized, the program proceeds to step #4. When no measured value is memorized, it is discriminated whether or not the photometer has a measured value at next step #2. If the measurement has already been carried out and the display elements LCD1 and LCD2 are displaying a measured value, the program proceeds to step #3, at which the measured value on display is stored in a given RAM for a temporary storage. Thereafter, the measured value is also stored in RAM6 in the form of corresponding data $AV_0$. At step #5, data FIX is stored in RAM3. At step #6, some of data stored in the respective memories RAM1 through RAM11 are displayed on the display elements LCD1 and LCD2. At step #7, the program makes a temporary halt till any one of the switches SW1 through SW9 is turned on or the switch SW10 is changed over. This paper omits the description on how CPU functions when the switches SW2 through SW7 are turned on or when the switch SW10 is changed over, due to the deviation from the subject matter of the invention.

Figure 9B:
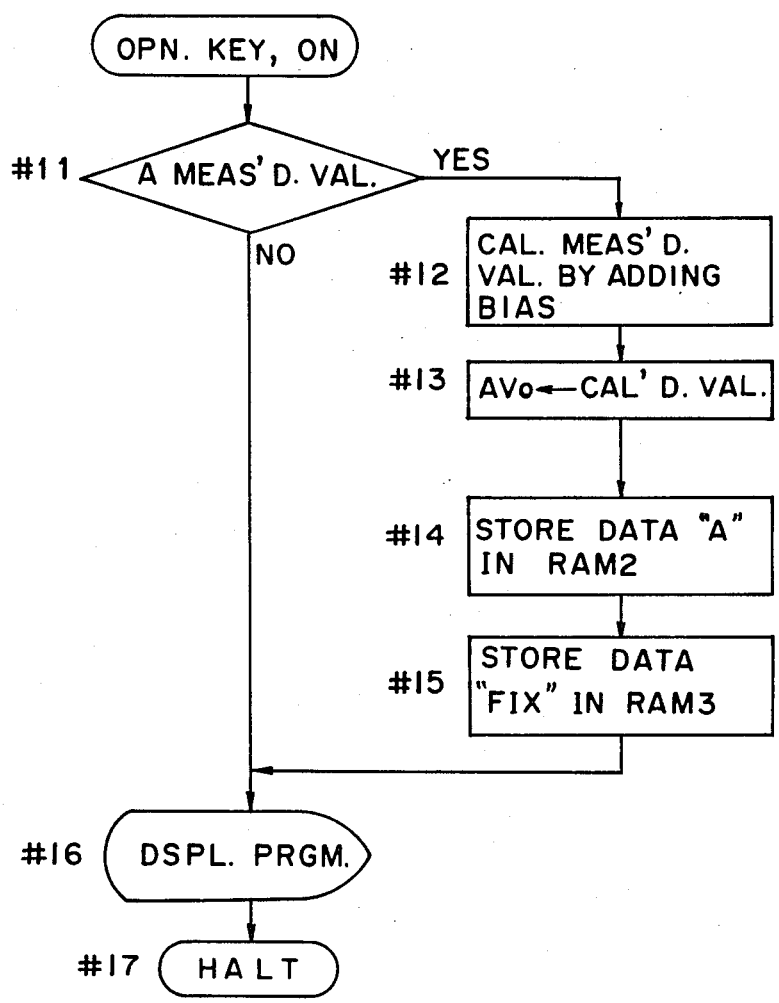
FIG. 9(b) shows a flow of a program to be carried out when an operation key is in an ON-state.

FIG. 9(b) shows a flow of a program to be carried out when the OPERATION key SW8 is turned on. In this flow, at step #11, it is discriminated whether or not the photometer has some measured value actually. When the measurement has already been carried out and the display elements LCD1 and LCD2 are displaying the measured value, the program proceeds to step #12, at which an arithmetic operation is carried out to perform a modification by adding a bias to the measured value. It is to be noted that the bias is a value predetermined based on the reference for highlight exposure calculation or on that for shadow exposure calculation, so that the arithmetic operation gives a F-number (calibrated value) suited to either of the references.

At step #13, the F-number given by the arithmetic operation is stored in RAM 6 in the form of data $AV_0$. Subsequently, at step #14, data A is put into RAM2 and at step #15, data FIX is put into RAM 3. Thereafter, at step #16, some of the data stored in the respective memories RAM1 through RAM 11 are displayed on the display elements LCD1 and LCD2. At step #17, the program makes a temporary halt till any one of the switches SW1 through SW9 is turned on or till the switch SW10 is changed over.

Figure 10:
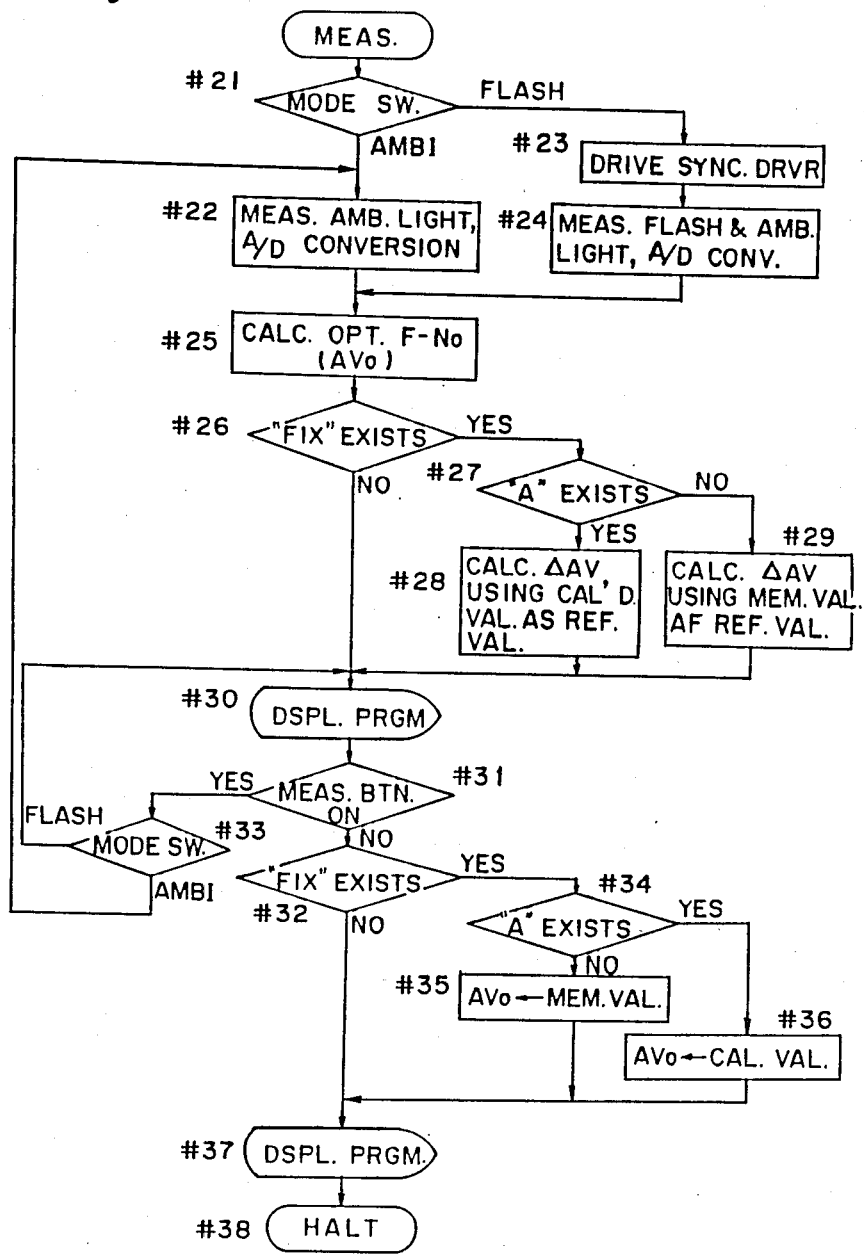
FIG. 10 shows a flow of a program to be carried out in relation to the display of deviation.

The following is concerned to the deviation value display of the photometer. The program for it will be described in accordance with its flow shown in FIG. 10.

This program starts when the measurement button SW1 shown in FIG. 6 is brought to an ON-state. When the mode switch SW10 is discriminated to be set to "AMBI" at step #21, the program proceeds to step #22, at which the photometer measures the ambient light for a specified time and the light value obtained through this measurement is converted into the digital form. On the other hand, when the mode switch SW10 selects "FLASH" at step #21, the program proceeds to step #23, at which CPU outputs a signal at a high level from the output terminal O7. The signal causes the synchro driver DV1 to function so as to short-circuit the synchronous terminal T1. Thereafter, at step #24, measurement of flashlight containing some ambient light is carried out with a shutter speed which an operator has already set manually using the UP key SW3 or the DOWN key SW4. Light value obtained through this measurement is converted into the digital form. At step #25, an optimum F-number (a measured value) is calculated from the light value obtained at step #22 or step #24, the film sensitivity and shutter speed set manually, as described before, using the switches SW2 through SW4. The F-number so obtained is stored in RAM6 in the form of data $AV_0$. At step #26, it is discriminated whether RAM3 preserves data FIX indicating that data $AV_0$ corresponding to the modified value or the value memorized in advance is stored in RAM6. The data $AV_0$ has been stored in RAM6 when the OPERATION key SW8 or the FIX key SW9 is turned on.

When the data FIX is present, the program proceeds to step #27, at which CPU catches the ON-state of the OPERATION key SW8 and discriminates whether RAM2 is storing the data A for indicating the existence of the modified value in storage. When the data A is present, the program proceeds to step #28, at which the difference between the value obtained through the measurement of step #22 or of step #24 and the modified value stored in RAM6 is calculated as data $\Delta AV$ to be stored in RAM4. On the other hand, when it is judged at step #27 that the data A does not exist, the program proceeds to step #29, at which the difference between the value obtained at step #22 or of step #24 and the value memorized in advance is calculated as data $\Delta AV$ to be stored in RAM4.

At step #30, any data stored in memories RAM1 through RAM 11 is displayed on the display elements LCD1 and LCD2.

At step #31, the state of the measurement button SW1 is discriminated. When it is discriminated that the measurement button SW1 is in an ON-state, the program proceeds to step #33, at which discrimination on which mode the mode switch SW10 selects is performed. When the mode switch SW10 is set to "FLASH", the program returns to step #30. When the mode switch SW10 to set to "AMBI", the program returns to step #22. When it is discriminated at step #31 that the measurement button SW1 is in an OFF-state, the program proceeds to step #32, at which whether or not the data FIX is stored is discriminated. The data FIX being present, the program proceeds to step #34, at which the existence of the data A is checked. When the data A is present, the program proceeds to step #36, at which RAM6 stores data $AV_0$ corresponding to the value modified based on the reference for highlight or shadow effect. When the data A is not present at step #4, the program proceeds to step #35, at which RAM6 stores data $AV_0$ corresponding to the value memorized in advance. At step #37, any data stored in memories RAM 1 through RAM11 is displayed on the display elements LCD1 and LCD2. At step #38, the program makes a temporary halt till any one of the switches SW1 through SW9 is turned on or the switch SW10 is changed over.

To sum up, when the OPERATION key SW8 is turned on, the aperture computation, which is programmed in advance to obtain an aperture (F-number) based on the reference for the highlight effect or that for the shadow effect, is carried out. The result of the aperture computation is displayed as F-number at the measured value display portion (b) of each of the display elements LCD1 and LCD2. In the case that the FIX key SW9 is brought into an ON-state, the measured value display portion (b) of each of the display elements LCD1 and LCD2 displays a measured value which has been put in storage by turning the MEMORY key SW5 on. The depressing of the OPERATION key SW8 makes a displayed value be stored as a modified value. Similarly, the depressing of the FIX key SW9 makes a displayed value be stored as a value memorized in advance. The storage of the displayed values is confirmed by the lighting of the data-holding mark (g) on each of the display elements LCD1 and LCD2.

If the measurement button SW1 is depressed later again, the measured value display portion (b) of each of the display elements LCD1 and LCD2 displays the deviation of an actual measured value from either the modified value or the value memorized in advance. When the mode switch SW10 is set to "AMBI", keeping the measurement button SW1 in an ON-state allows a continuous measurement and CPU continues to calculate new difference values to display them one after another on the measured value display portion (b) of each of the display elements LCD1 and LCD2. But, when the mode switch SW10 is set to "FLASH", only one measurement is effected even if the measurement button SW10 keeps to be depressed, and CPU keeps to display one value obtained in that measurement.

Bringing the measurement button SW1 into an OFF-state causes the measured value display portion (b) of each of the display elements LCD1 and LCD2 to display again the modified value or the value memorized in advance which are kept in their respective memories.

A difference of a measured value of a flashlight containing an ambient light and that of only the ambient light is displayed by digits in the following way. First, a measurement is carried out with the mode switch SW10 being set to "AMBI". A measured value obtained through this measurement is stored in a memory by operating the MEMORY key SW5 and then, the measured value thus stored is held in another memory as standard for the difference calculation by operating the FIX key SW9. After completing the above procedure, another measurement is carried out with the MODE switch SW10 being set to the other mode "FLASH". Then, the measured value display portion (b) of each of the display elements LCD1 and LCD2 displays the difference of the measured value of the flashlight containing the ambient light from that, stored in advance and being held now, of only the ambient light. The order of carring the above measurements out is alternative, that is, the measurement for "FLASH" may precede that for "AMBI". In that case, what is changed is the display of the negative sign, in other words, a positive value is changed to a negative one, and vice versa.

The release from memory of the modified value and the value memorized in advance either of which is displayed on the measured value display portion (b) of the display elements LCD1 and LCD2 by operating the FIX key SW9 is effected by bringing the RECALL key SW6 into an ON-state. If the measurement button SW1 is depressed after the release of such a value, the display elements LCD1 and LCD2 display data $AV_0$.

In the above embodiment a single button is used both for the initial measurement and for the subsequent measurement to obtain a difference value, but, alternatively, the photometer may be provided with two independent buttons to be depressed for such measurements. Furthermore, in addition to the above embodiment in which the FIX key SW9 functions so that the value memorized in advance by the operation of the MEMORY key SW5 may be displayed at the measured value display portion (b) of the display elements LCD1 and LCD2 and stored in RAM6 preferentially, what is to be kept in RAM6 preferentially may be the ultimate (previous) measured value.

As is obvious from the above description, according to the present invention, a difference in measured value between different points of a subject can be obtained by a single light measuring means. In other words, the luminance range of the subject is obtained by a photometer of a simple construction, as compared with a conventional one having two light measuring means. Accordingly, operators can easily confirm whether or not the luminance range of the subject is within the effective exposure range of a film.

In addition, the measured value can be memorized in advance by the operation of a switch, so that the measured value memorized is preserved in preference to an actual measured value as a reference for calculating the deviation of other points, though, without any value memorized in advance, the actual measured value is preserved as the reference. Accordingly, if a light value obtained through a measurement of an important point of the subject is memorized in advance, the memorized value is preferentially fetched to be automatically used as the reference value for calculating deviation of each of measured values of other points of the subject. Therefore, the measurement of said important point of the subject does not require to be repeated. Thus, operators can enjoy a photometric convenience.

Furthermore, according to the present invention, digits displayed by the display means can be big in size, and therefore, legible display can be obtained since the display means is adapted to switch over the display of a first measured value and a deviation of another measured value from the first one. It may be favorable for the display means to be adapted to display a mark indicating the data holding, because operators can be easily realize the fact that a measured value is stored actually.

Moreover, according to the present invention, which comprises the operational means to add a bias to a measured value and the preserving means, a modified light value based on the measured value is obtained and stored. So, when necessary, the modified measured value can be displayed by the display means and, in measurements carried out after the modified value is stored, the deviation of an actual measured value is calculated based on the modified value in storage and displayed. Thus, operators can easily get information necessary for the decision of an optimum aperture.

Moreover, according to the present invention which also comprises means for selecting a first photometric state to measure flashlight containing an ambient light or a second photometric state to measure only the ambient light, measurements can be carried out in both photometric states only by the switchover of the above means. Therefore, the difference between the measured values in the flashlight containing the ambient light and in only the ambient light can be obtained by preserving a light value obtained first in one of the above photometric states and then measuring a light value in the other photometric state. The obtained deviation is displayed by digits by the display means so that the amount of the effective flashlight components may be numerically visualized. Accordingly, operators can easily and quantitatively adjust the effect of such ambient light as a tungsten lamp on a image according to the photographing purposes by regulating the effective flashlight amount.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A photometer comprising:
  first and second operating members;
  a light measuring means which is actuated by the first operating member so as to start a measurement;
  a holding means which holds a measured light value, obtained through the measurement by the light measuring means, when the second operating member is operated;
  a calculating means which calculates deviation of a measured light value obtained through the measurement effected by the light measuring means from the measured light value held by the holding member; and
  a displaying means by which;
  (a) when the holding means is not holding a measured light value, a measured light value obtained through the measurement effected by the light measuring means is displayed,
  (b) when the holding means is holding a measured light value and the first operating member is out of operation, the measured light value being held is displayed, and
  (c) when the holding means is holding a measured light value and the first operating member is operated, the deviation obtained by the calculating means is displayed instead of the measured light values while the first operating member is in operation.

2. A photometer as set forth in claim 1, wherein the displaying means includes a portion where some display is carried out so as to indicate that a measured light value is being held by the holding means.

3. A photometer as set forth in claim 1, which further comprises a third operating member to be operated so as to clear a measured light value held by the holding means.

4. A photometer comprising:
  first and second operating members;
  a light measuring means which is actuated by the first operating members so as to start measurement;
  a modifying means for adding a predetermined bias to a measured light value obtained through the measurement effected by the light measuring means in response to the operation of the second operating member;
  a holding means which holds a light value modified by the modifying means;
  a calculating means which calculates deviation of a measured light value obtained through the measurement effected by the light measuring means from the modified light value, as standard, being held by the holding means; and
  a displaying means by which;
  (a) when no modified light value is being held by the holding means, a measured light value obtained through the measurement effected by the light measuring means is displayed,
  (b) when the holding means is holding a modified light value and the first operating member is out of operation, the modified light value held by the holding means is displayed, and
  (c) when the holding means is holding a modified light value and the first operating member is operated, deviation calculated by the calculating means is displayed instead of said measured light value or modified light value.

5. A photometer as set forth in claim 4, wherein the displaying means includes a portion where some display is carried out so as to indicate that a modified light value is being held by the holding means.

6. A photometer as set forth in claim 4, which further comprises a third operating member to be operated so as to clear the modified light value held by the holding means.

7. A photometer comprising:
  a measurement initiating means;

a light measuring means which is caused to start a measurement by the operation of the measurement initiating means;

a first operating member;

a storing means for memorizing the measured light value in response to the operation of the first operating member;

a second operating member;

a holding means which, if the storing means is storing a measured light value when the second operating member is operated, holds the stored value, while it holds a measured light value obtained by the light measuring means if no measured value is stored in the storing means when the second operating member is operated;

a calculating means which calculates deviation of a measured light value obtained by the light measuring means from a measured light value, as standard, held by the holding means when the measurement initiating means is operated under the condition that the holding means is holding a measured light value; and a displaying means for displaying a measured light value obtained by the light measuring means, which value is replaced by a value held by the holding means when the second operating member is operated, and is also replaced by the deviation after it has been obtained by the calculating means.

8. A photometer as set forth in claim 7, wherein the holding means includes a third operating member for causing a held measured light value to be cleared.

9. A photometer comprising:

a measurement initiating means;

a light measuring means which is caused to start a measurement by the operation of the measurement initiating means;

a first operating member;

a storing means for storing s measured light value obtained through the measurement by the light measuring means in response to the operation of the first operating member;

a second operating member;

a modifying and holding means by which, (a) if the storing means is storing a measured light value when the second operating member is operated, an arithmetic operation to add a predetermined bias to the stored light value is effected for modifying the stored light value and then the operation results are held, and (b) if the storing means is storing no measured light value, the arithmetic operation is effected for adding the predetermined bias to a measured light value obtained through the measurement by the light measuring means and then the operation results are held;

a calculating means by which, when the measurement initiating means is operated while the modifying and holding means is storing a modified light value, deviation of an actual measured light value obtained by the light measuring means from the modified light value, as standard, being held by the modifying and holding means is calculated; and a displaying means for displaying a measured light value obtained by the light measuring means, which value is replaced by a value held by the modifying and holding means when the modifying and holding means is operated, and is also replaced by the deviation after it has been obtained by the calculating means.

10. A photometer comprising:

a selecting means which selects either a first photometric state for measuring a flashlight containing an ambient light or a second photometric state for measuring the ambient light;

a measurement initiating means;

a measuring means which is actuated by the measurement initiating means so as to carry out a measurement in one of the first and second photometric states selected by the selecting means;

an operating member;

a holding means which holds a measured light value obtained in the one of the above photometric states when the operating member is operated;

a calculating means by which, when the measurement initiating means is operated after selection of the other photometric state under the condition that the holding means is holding a measured light value obtained in the one photometric state, a deviation of a measured light value obtained through the measurement effected by the measuring means in the other photometric state from the measured light value held by the holding means is calculated; and a displaying means which numerically displays the measured light value obtained by the measuring means, which value is replaced by the deviation calculated by the calculating means.

11. A photometer as set forth in claim 10, wherein the holding means includes a second operating member for causing a held measured light value to be cleared.

* * * * *

UNITED STATES PATENT AND TRADEMARK OFFICE
CERTIFICATE OF CORRECTION

PATENT NO. : 4,737,815
DATED : 4/12/88
INVENTOR(S) : Kazuhiko Naruse et al.

It is certified that error appears in the above-identified patent and that said Letters Patent is hereby corrected as shown below:

Column 3, line 20, delete "mears" and insert --means--.

Column 3, line 37, delete "memcrizing" and insert --memorizing--.

Column 6, line 65, delete "prcvides" and insert --provides--.

Column 7, line 66, delete "t.he" and insert --the--.

Signed and Sealed this

Twenty-ninth Day of November, 1988

Attest:

DONALD J. QUIGG

Attesting Officer     Commissioner of Patents and Trademarks